(12) United States Patent
Manson

(10) Patent No.: US 8,380,678 B2
(45) Date of Patent: Feb. 19, 2013

(54) TRACKING FILES WHICH HAVE BEEN PROCESSED BY A BACKUP OR A RESTORE OPERATION

(75) Inventor: Carl R. Manson, Eden Prairie, MN (US)

(73) Assignee: Symantec Corporation, Mountain View, CA (US)

( * ) Notice: Subject to any disclaimer, the term of this patent is extended or adjusted under 35 U.S.C. 154(b) by 365 days.

(21) Appl. No.: 12/624,564

(22) Filed: Nov. 24, 2009

(65) Prior Publication Data

US 2011/0125717 A1    May 26, 2011

(51) Int. Cl.
 *G06F 17/00*    (2006.01)
(52) U.S. Cl. ........ 707/679; 707/639; 707/654; 707/653; 707/650; 707/646
(58) Field of Classification Search .................. 707/644, 707/649, 650, 640, 646, 653, 654, 639, 679
See application file for complete search history.

(56) References Cited

U.S. PATENT DOCUMENTS

| 7,266,655 | B1 | 9/2007 | Escabi, II et al. |
| 7,725,438 | B1 | 5/2010 | Shah et al. |
| 7,756,833 | B2 | 7/2010 | van Ingen et al. |
| 7,953,945 | B2 * | 5/2011 | Bender et al. ................. 711/161 |
| 7,987,158 | B2 * | 7/2011 | Boyd et al. .................... 707/649 |
| 8,024,298 | B2 * | 9/2011 | Dile et al. ...................... 707/650 |
| 8,046,332 | B1 * | 10/2011 | Pruthi et al. ................... 707/644 |
| 8,055,862 | B2 * | 11/2011 | Bender et al. ................. 711/161 |
| 2009/0271412 | A1 * | 10/2009 | Lacapra et al. ................. 707/10 |
| 2009/0307286 | A1 | 12/2009 | Laffin |
| 2010/0274763 | A1 | 10/2010 | van Ingen et al. |

OTHER PUBLICATIONS

"TeraMerge® Enables Multiple Level Synthetic Backup Consolidation for the Full Version of the True incremental Backup System®"; Teradactyl LLC; 2007; 4 pages.
"Partial Cumulative Incremental Backups Offer Unique Advantages to Customers"; Teradactyl LLC; 2007; 4 pages.
"TeraMerge® Enables Single Level Synthetic Backup Consolidation for the Lite Version of the True incremental Backup System®"; Teradactyl LLC; 2007; 6 pages.

* cited by examiner

*Primary Examiner* — Sana Al Hashemi
(74) *Attorney, Agent, or Firm* — Meyertons Hood Kivlin Kowert & Goetzel, P.C.; Jeffrey C. Hood

(57) ABSTRACT

Tracking files which have been processed by a backup/restore operation. A request to perform a backup/restore operation for files on a target computer may be received at the target computer. The request may be received from a server computer. Information regarding which files on the target computer have been processed by the backup/restore operation may be maintained by the target computer. The information may be configured to be used for restart of the backup/restore operation at a requested file. Maintaining the information may include storing file identifiers into a data structure on the target computer corresponding to files that have processed by the backup/restore operation.

20 Claims, 4 Drawing Sheets

TRACKING FILES WHICH HAVE BEEN PROCESSED BY A BACKUP OR A RESTORE OPERATION

BACKGROUND

1. Technical Field

This disclosure relates generally to data backup systems, and, more specifically, to a system and method for tracking files which have been processed by a backup or a restore operation.

2. Description of the Related Art

Computer systems, and their components, are subject to various types of failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g., the storage device, connectors (e.g., cables) between the storage device and other circuitry, the network between the storage device and the accessing computer system (in some cases), etc.).

To mitigate the risk of losing data, computer systems typically replicate (or make backup copies of) data stored on various computers and storage devices. When performing a backup of data from a remote system, sometimes the backup can fail. This can happen for various reasons including such things as intermittent network issues or even the need to manually stop the backup. When this happens, it is often desirable to restart the failed backup near the point where the failure occurred. There are essentially two main issues in performing such a restart. The first is determining a point in the backup where the entire backup data stream has been recorded for the last file examined; the second is determining where the remote client should restart its backup. It is not difficult to keep track of what the last file backed up is. When it comes to restarting on the client, figuring out where to restart can be more complicated. For example, even if the last successfully backed up file is known, there may be difficulties finding a new starting point on the client if that file no longer exists on the system being backed up. Accordingly, improvements in systems for tracking files which have been processed by a backup or a restore operation, in particular for use in restarting interrupted backup operations, are desirable.

SUMMARY

Embodiments are presented of a system and method for tracking files which have been processed by a backup or a restore operation. In some embodiments, the information tracked may be configured for use in restarting an interrupted backup or restore operation.

One set of embodiments includes a computer-readable storage medium comprising program instructions and associated method for replicating data. The program instructions/method may be executable to perform the following steps. A request to perform a backup or a restore operation for files on a target computer may be received at the target computer. The request may be received from a server computer. The information may be configured to be used for restart of the backup or restore operation at a requested file.

According to some embodiments, maintaining the information may include storing file identifiers into a data structure on the target computer corresponding to files that have processed by the backup or restore operation. In some embodiments, the file identifiers may be stored into the data structure on the target computer as the corresponding files are processed by the backup or restore operation. Embodiments are further contemplated in which the file identifiers are stored in the data structure as a Last In First Out (LIFO) stack of file identifiers.

According to some embodiments, maintaining the information may further include maintaining a first file which stores a minimum and maximum file identifier encountered during the backup or restore operation. Maintaining the information may also include maintaining a second file, wherein the second file includes a stack of file identifiers for files, as the files are processed by the backup or restore operation. In some embodiments, maintaining the information may also include maintaining a third file, where the third file includes a timestamp of the start of the backup or restore operation.

In some embodiments, maintaining the information may include creating a separate directory for each file system and each volume that is processed by the backup or restore operation.

According to some embodiments, the backup or restore operation may be halted on the target computer. The program instructions/method may then further include regenerating a list of files to be processed by the backup or restore operation. A file at which to restart the backup or restore operation may be identified in the list of files to be processed by the backup or restore operation. Identifying the file at which to restart the backup or restore operation may utilize the file identifiers corresponding to files that have processed by the backup/restore operation. The backup or restore operation may be restarted at the identified file in the list of files.

In further embodiments, a hash table may be constructed. The hash table may be indexed by the file identifiers. Identifying the file at which to restart the backup or restore operation in the list of files to be processed by the backup or restore operation may thus in some embodiments utilize the hash table to search the list of files for the file at which to restart the backup/restore operation.

In a further set of embodiments, a system for tracking files which have been processed by a backup or a restore operation is contemplated. The system may include one or more processors and a computer readable storage medium. The computer readable storage medium may include program instructions executable by the one or more processors to perform the operations described above.

Figure 1:
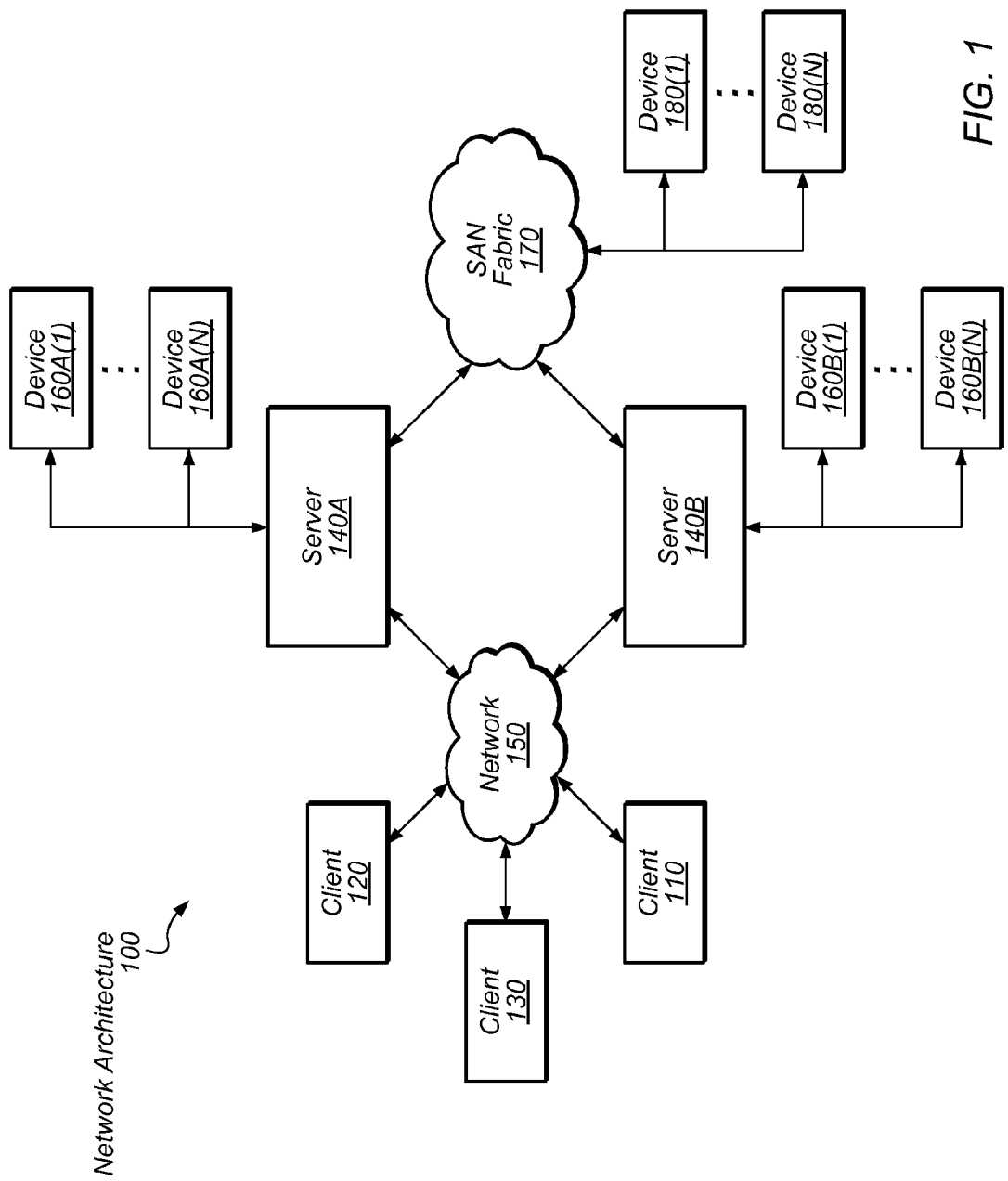
FIG. 1 is a block diagram illustrating a network architecture according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Client system." This term has its ordinary and accepted meaning in the art, which includes a computer system that requests services, data, etc. from a server system.

"Backup/Restore Operation" This term is used to mean a backup operation or a restore operation, or both. The terms "backup operation" and "restore operation" have their ordinary and accepted meanings in the art; thus a backup operation may include an operation to back up data from a computer system, and a restore operation may include an operation to restore data to a computer system.

Figure 2:
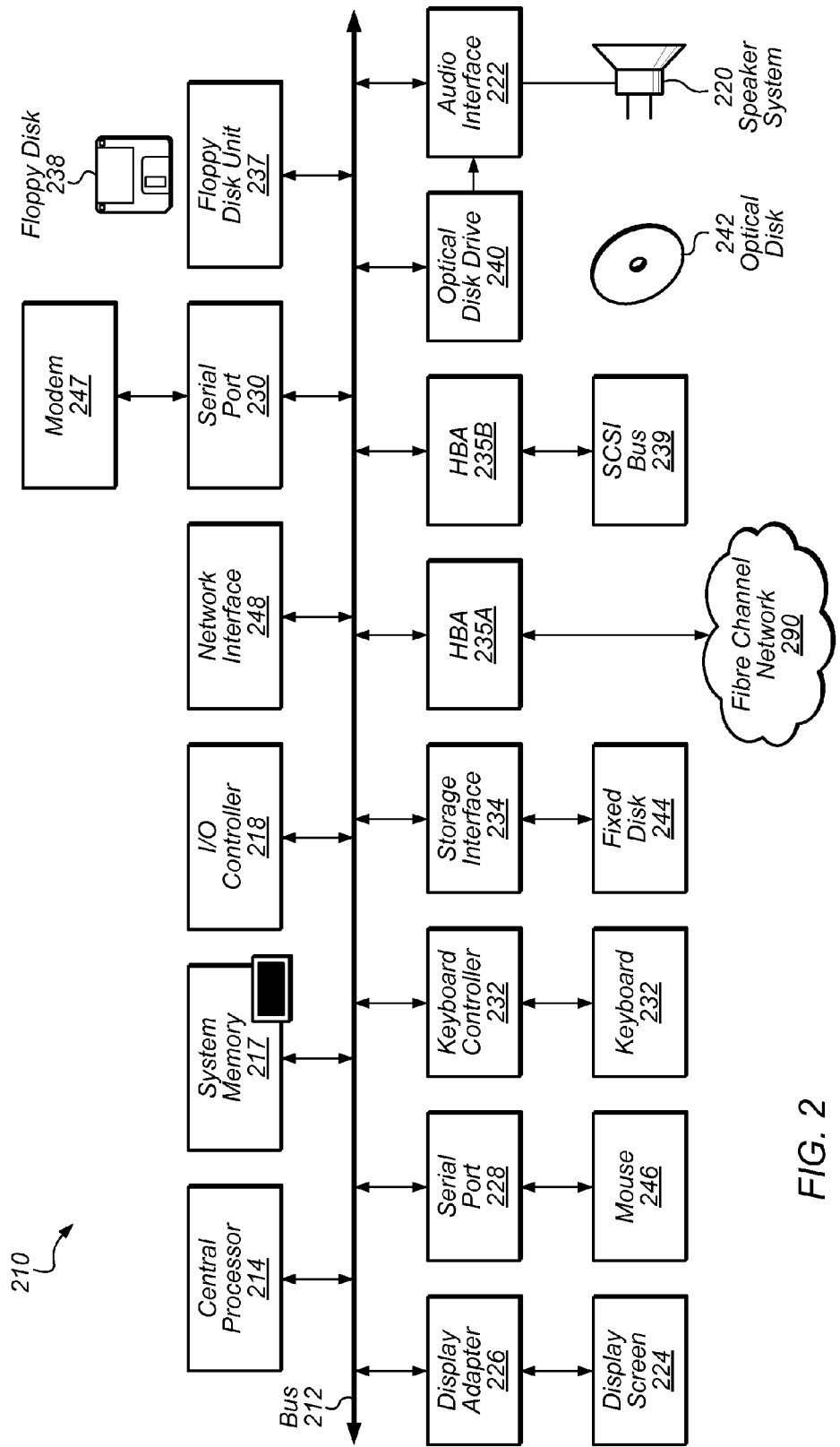
FIG. 2 is a block diagram illustrating a computer system according to one embodiment.

Turning to FIG. 1, a block diagram is shown depicting a network architecture 100 in which client systems 110, 120 and 130, as well as storage servers 140A and 140B (any of which can be implemented using computer system 210, shown in FIG. 2), are coupled to a network 150. Storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N). Additionally, a user may be able to request that certain tasks be performed using a client system 110, 120, or 130. For example, in one embodiment, a user may desire that a backup of a client system be taken; in another embodiment, a user may desire that restore operation be performed in order to restore a client system to a prior (backed up) state. Additionally, in some embodiments, a user may be able to request that a backup or restore operation be restarted, e.g., if it has been halted. The user may be able to create such backup/restore requests using a client system 110, 120, or 130. Backup and restore operations (or requests to restart interrupted backup and restore operations) may likewise be requested via a server (e.g., server 140A or server 140B). In some embodiments backup operations (and/or backup operation requests) may be performed automatically, e.g., without direct user input specifying that the backup operations be performed. For example, embodiments are contemplated in which backup operations are performed according to a predetermined schedule.

Many embodiments of the present disclosure may be implemented by a client computer system (such as one or clients 110, 120, 130). However, it will be noted that embodiments are also contemplated in which the present disclosure may be implemented by any of various kinds of computer systems. In addition, it should be noted that although FIG. 1 illustrates an exemplary network architecture that could be used to implement the present disclosure, the computer system(s) implementing the present disclosure may be connected in any of various ways. For example, FIG. 1 depicts the use of a network such as the Internet for exchanging data, but the present disclosure is not limited to the Internet or any particular network-based environment. It will also be noted that in some embodiments, part or all of the present disclosure could be implemented as part of a cloud computing environment.

FIG. 2 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., tape drives, tape libraries, disk arrays, document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
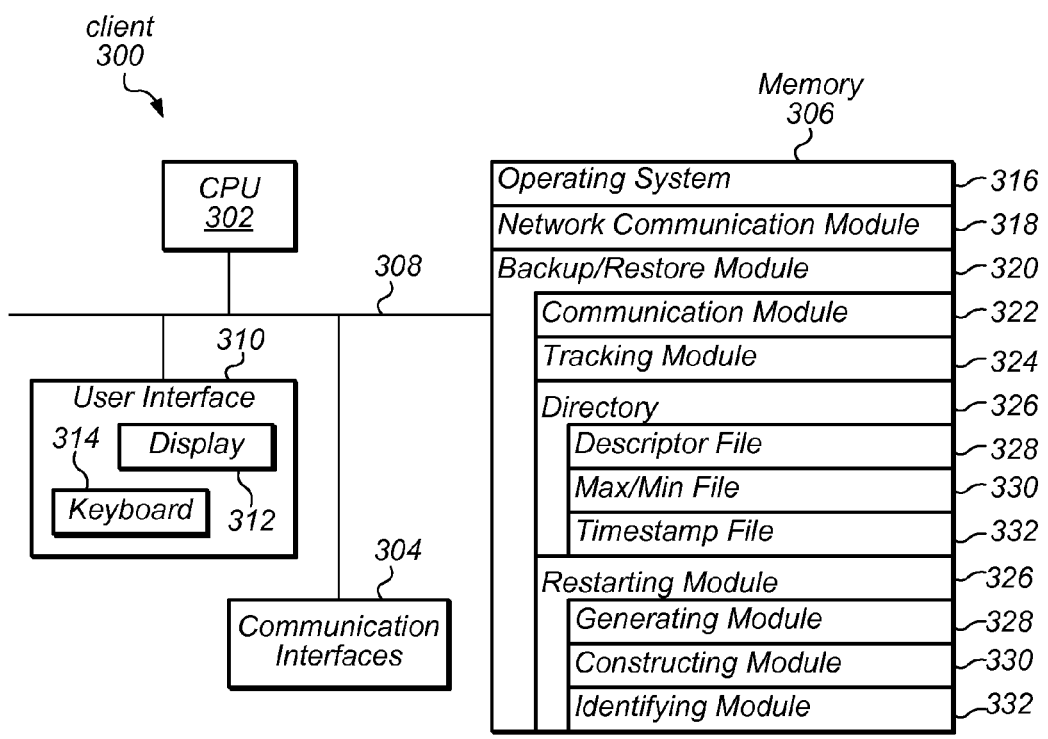
FIG. 3 is a block diagram illustrating one embodiment of a representative computer system configured to track files which have been processed by a backup or a restore operation.

FIG. 3 is a block diagram illustrating one embodiment of a computer system implementing the present disclosure, such as any of the client computer systems shown in FIG. 1. Although FIG. 3 represents one embodiment, it will be recognized that any number of variations thereof are also possible.

The client 300 typically includes one or more processing units (CPUs) 302, one or more network or other communications interfaces 304, memory 306, and one or more communication buses 308 for interconnecting these components. The client 300 may optionally include a user interface 310, including a display 312 and a keyboard 314. The memory 306 may include high speed random access memory and may also include non-volatile memory, such as one or more magnetic or optical storage disks. The memory 306 may include mass storage that is remotely located from CPUs 302. The memory 306 may store the following elements, or a subset or superset of such elements:

an operating system 316 that includes procedures for handling various basic system services and for performing hardware dependent tasks;

a network communication module (or instructions) 318 that is used for connecting the client 300 to other computers via the one or more communications interfaces 304 (wired or wireless), such as the Internet, other wide area networks, local area networks, metropolitan area networks, and so on; and a backup/restore module 320 for performing backups and/or restores on the client 300 and for tracking and storing information that can be used to restart an interrupted backup or restore operation.

In some embodiments, the backup/restore module 320 may include the following elements, or a subset or superset of such elements:

a communication module 322 for receiving and sending information (e.g., requests to perform tasks or other information);

a tracking module 324 for tracking information that can be used to restart an interrupted backup or restore operation;

one or more directories 326, each storing one or more files such as a descriptor file 328, a max/min file 330, and/or a timestamp file 332; and a restarting module 326 for restarting an interrupted backup or restore operation.

In some embodiments, the restarting module 326 may further include the following elements, or a subset or superset of such elements:

a generating module 328 for regenerating a list of files to be processed by the backup or restore operation;

a constructing module 330 for constructing a hash table for use in searching the list of files to be processed by the backup or restore operation; and an identifying module 332 for identifying a file at which to restart the backup or restore operation.

It should be noted that in various embodiments, some or all of the modules above may be combined together or separated into further modules.

Figure 4:
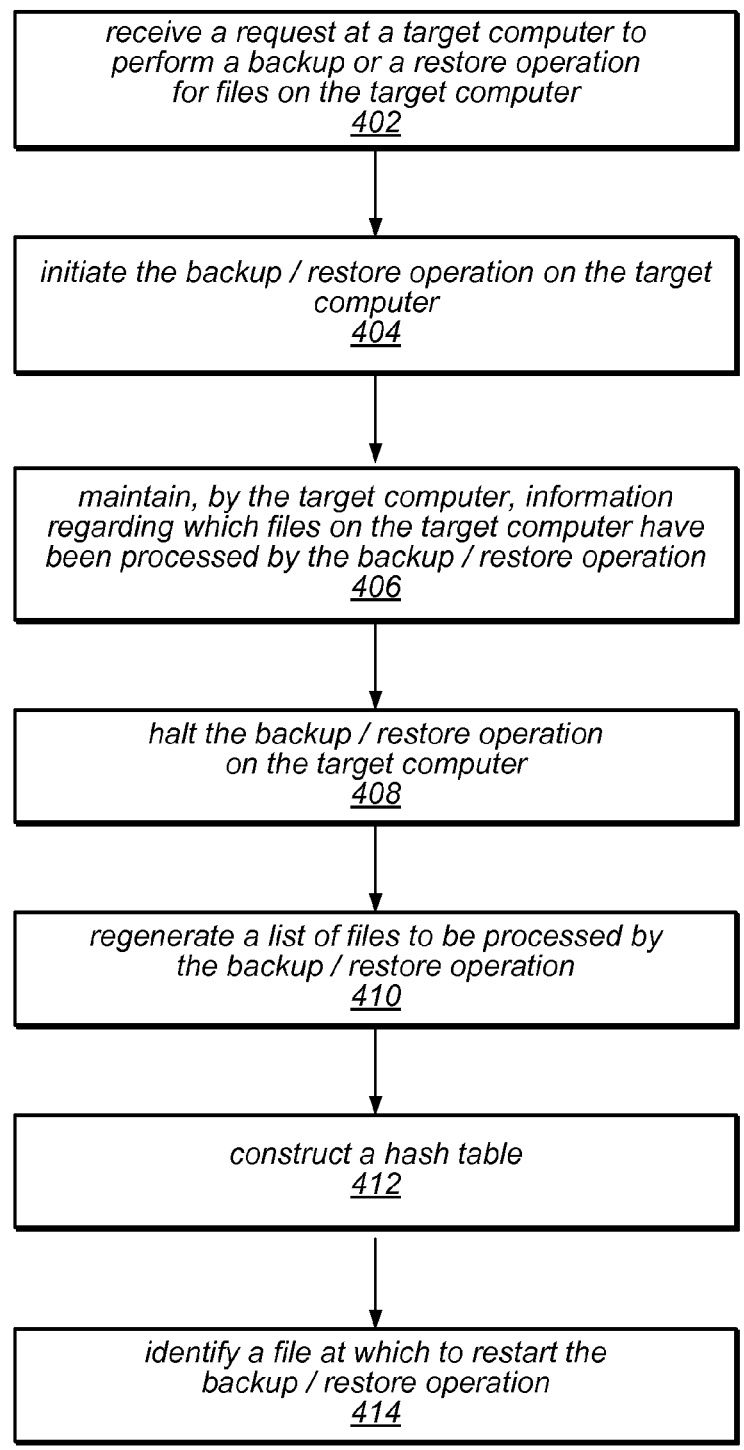
FIG. 4 is a flow diagram illustrating one embodiment of a method for tracking files which have been processed by a backup or a restore operation.

Turning now to FIG. 4, a method is disclosed for tracking files which have been processed by a backup/restore operation. The method may substantially address many of the problems presented by current backup and restore operation restarting systems. More specifically, if commonly provided file identifiers (such as i-node numbers on Unix-type systems and file ids on Windows systems) are used to track files that have been processed by a backup/restore operation, the information necessary to restart an operation can be efficiently tracked without doing any of the sorting needed for file name based approaches, e.g., since the file identifiers may provide uniqueness within a volume or file system. In addition, according to some embodiments, performing this processing on the machine being backed up (e.g., as opposed to centralized servers), may assist in more evenly distributing work load across an enterprise computing system.

The method may be implemented by one or more computer systems (e.g., any of the client and server computer systems shown in various of the Figures). The computer system may typically include, for example, one or more processors, and a computer readable storage medium which stores program instructions executable by the one or more processors to perform part or all of the method. Each computer system may also include other hardware and/or components, for example, any of the hardware and components shown in and described with respect to FIG. 2. Other embodiments include a computer readable storage medium (e.g., an article of manufacture) which stores program instructions executable to implement part or all of the method according to the embodiments described herein.

It should be noted that although the description below may set forth steps as being performed in a particular order, various of the steps may be performed in a different order, repeated, or omitted, as desired. One or more additional steps may also be performed, in some embodiments. The method may be performed as described below.

In 402, a request may be received at a target computer to perform a backup or a restore operation for files on the target computer. In some embodiments, the request may be received by the communications sub-module 322 in backup/restore module 320 on client 300. The request may be based on a user request to perform the backup or restore, or the request may be automatically generated, e.g., based on a schedule or triggering event. The request may have been generated on the target computer (e.g., client 300), or may have been remotely generated, e.g., on a server or other computer system.

In 404, the backup or restore operation may be initiated on the target computer. In some embodiments, the backup or restore operation may be performed on the target computer by the backup/restore module 320 on client 300. The backup or restore operation may include actions typical of a backup or restore operation. For example, a backup operation might include processing files on the target computer and creating a backup image including images of the processed files. Creating a backup image might also include creating an index (e.g., including meta-data) for use in restoring the backup image to a computer system. A restore operation might include processing the files from a backup image to restore them to the target computer system, e.g., using an index for the backup image. Any number of variations, such as would be known by those of skill in the art, are also contemplated with regard to the basic functionality of the backup/restore operation.

In 406, information regarding which files on the target computer have been processed by the backup/restore operation may be maintained by the target computer. In some embodiments, the information may be maintained by the tracking sub-module 324 of the backup/restore module 320 on client 300. The information may be configured to be used to restart the backup/restore operation if the backup/restore operation is interrupted.

In some embodiments, maintaining the information may include storing file identifiers into a data structure on the target computer corresponding to files that have been processed by the backup/restore operation. In other words, the information may identify which files have been processed by the backup or restore operation on the target computer. In some embodiments, the file identifiers may be stored into the data structure as the corresponding files are processed by the backup/restore operation on the target computer.

In one set of embodiments, maintaining the information may include creating a directory (such as directory 326 on client 300) for each file system or volume encountered in the backup or restore operation. In other words, if the system being backed up or restored includes multiple volumes and/or file systems, there may be a directory created and maintained for each. Each directory may include one or more files for its respective file system or volume. For example, in some embodiments, each directory may include a descriptor file (such as descriptor file 328), a max/min file (such as max/min file 330) and a timestamp file (such as timestamp file 332). An exemplary set of embodiments utilizing these three files for each file system or volume is described below, although it will be recognized that any number of other embodiments, e.g., in which a different file or set of files are created and stored in the directory for each file system or volume, are also possible.

The descriptor file may include a list (or stack) of file identifiers for files that are processed by the backup/restore operation. In some embodiments, the list may be updated as the files are processed by the backup/restore operation. The stack of file identifiers may be a last in first out (LIFO) stack of file identifiers. In other words, as each file is processed by the backup/restore operation, a file identifier corresponding to that file may be added to the descriptor file, in a location in the descriptor file (e.g., at the top of the descriptor file, in some embodiments) such that it will be the first file identifier read when the descriptor file is read.

The file identifiers may uniquely identify the files, within a given file system or volume. In some embodiments, the file identifiers may be those file identifiers already used and provided by an operating system. For example, the "i-node" number provided on Unix-type systems, or the "file IDs" used on Windows systems, may be used in some embodiments. The file identifiers may, in some embodiments, be binary file identifier values of a fixed size.

The max/min file may include the maximum file identifier (e.g., the maximum file identifier value) and the minimum file identifier (e.g., the minimum file identifier value). As described further below with regard to step 412, the max/min file may be used in constructing a hash table to facilitate restarting the backup/restore operation if it is interrupted, in some embodiments. The max/min file may be updated over the course of the backup/restore operation as the appropriate value(s) change.

The timestamp file may include a timestamp of the start of the backup/restore operation. The timestamp may be used in case of an interrupted backup, in order to determine whether a file has been modified since being processed in the backup operation (e.g., after the interruption), as described further below with regard to step 414. In some embodiments, the timestamp (and thus the timestamp file) may not be needed for a restore operation, although it may be included for restore operations if desired.

The directories and files described above may thus be created and maintained on a target computer to track files which have been processed by a backup or a restore operation on the target computer. If the backup or the restore operation completes successfully, the files may be unnecessary, and may in some embodiments be discarded. However, as described below, if the operation is halted, the files may be retained until the next backup or restore, so that they may be used to restart the original operation. In addition, embodiments are contemplated in which one or more of the files may be retained even after a successful backup/restore operation, e.g., for other purposes.

In 408, the backup/restore operation may be halted on the target computer. The backup or restore operation may be halted for any number of reasons. For example, an operation may fail because of intermittent network issues, component failure, or if an administrator manually halts the operation, among other possibilities. The backup or restore operation may thus be interrupted briefly (e.g., for a momentary failure), or for a longer period of time, in various embodiments. Once any reason(s) for halting the backup or restore operation have been removed, the target computer may receive a request to restart the operation. The request may be generated automatically (e.g., if it is detected that the condition causing the interruption is no longer present, or as an automatic retry at a predetermined time interval, or based on any other trigger) or may be generated manually, as desired.

To restart a backup or restore operation, the target computer may need to know the last file that was successfully processed in the operation. In the case of a restart operation, the target computer may be able to identify the last file restored from the information maintained by the target computer; for example, the last file restored may be identified by the last file identifier in the descriptor file. For a backup operation, the last file successfully processed on the target may be different than the last file successfully backed up (e.g., if the files are being backed up to a storage device, there may be a delay between processing files on the target computer and the files being successfully backed up). Thus in some embodiments, the target computer may receive (e.g., from a server) a file identifier of the last file successfully backed up along with the request to restart the operation.

Since the last file that was successfully backed up may not be the same as the last file processed on the target computer in backup operations, the descriptor file (e.g., as described above according to one embodiment) for an interrupted backup operation may include file identifiers for files that were not successfully backed up. Thus in some embodiments, each file identifier in the descriptor file which was added after the file identifier of the last successfully backed up file may be removed from the descriptor file prior to restarting the backup, so that the contents of the descriptor file accurately reflect the files on the target computer system that have been successfully processed.

In 410, a list of files to be processed by the backup/restore operation may be regenerated. In some embodiments, the list of files may be generated by generating sub-module 328 of restarting sub-module 326 of backup/restore module 320 on client 300. The list may be a list of all of the files that were to have been processed in the original backup or restore request. In some embodiments, the list may be a list of file identifiers identifying the files at were to have been processed in the original backup or restore request, or the list of files may at least include a file identifier for each file in the list.

In 412, a hash table may be constructed. In some embodiments, the hash table may be constructed by the constructing sub-module 330 of restarting sub-module 326 of backup/restore module 320 on client 300. The hash table may be used to effectively perform a binary search on unsorted data. In other words, the hash table may be used to speed up identification (e.g., step 414, described further below) of a file at which to restart the operation. It will be noted, however, other possible ways of speeding up identification of a file at which to restart the operation are also contemplated; in addition, in some embodiments, identification may simply be performed using the descriptor file and the list of files to be processed by the backup/restore operation without any assisting sorting or data structures.

According to some embodiments, the max/min file may be used to determine a size of the hash table. In other words, the minimum and maximum identifier values tracked during the initial operation may be used to size the hash table so that each file identifier in the descriptor file may be placed in the hash table. Thus, the hash table may be indexed by file identifier and may include each file identifier in the descriptor file. For each file identifier in the descriptor file, a corresponding bit location in the hash table may be marked.

In 414, a file at which to restart the backup/restore operation may be identified. In some embodiments, the file may be identified by the identifying sub-module 332 of restarting sub-module 326 of backup/restore module 320 on client 300. As noted above, identification of a file at which to restart the backup/restore operation may be assisted by use of a hash table such as described above. For example, in some embodiments, the file identifier of the middle entry in the list of files to be processed by the backup/restore operation may be checked against the hash table to determine whether or not that file has been processed. If it has been processed, the entry mid-way between toward the end of the list may be checked in the same way. If it has not, the entry mid-way toward the beginning of the list may be checked in the same way. This process may be repeated until a file at which to restart the backup/restore operation is identified. In some embodiments, the identified file may be the file in the list that has not been processed which is closest to the end of the list. In other words, the file may be the first file (in list order) which has not been processed.

As noted above, various embodiments are also contemplated in which a different means is used to determine whether or not a file has been processed than the hash table. Indeed, it is possible to determine whether or not a file has been processed simply by searching through the descriptor file to determine whether or not a file has been processed, bypassing the use of a hash table or other assisting data structure altogether. Alternatively, a different type of data structure, a sorting algorithm, or any other means may be used to assist in (e.g., speed up) determining whether a file in the file list has been processed, as desired. However, in many embodiments, using a hash table may be more efficient than simply searching through the descriptor file or performing a sorting operation.

It will be noted that because changes may occur to files during an interruption of a backup, it may be necessary to check processed files for changes when restarting a backup. In some embodiments, this may be done by comparing the modified time of a file to the start time of the previous operation. For example, this may be done using the timestamp file described above. If, in searching the hash table to determine whether a file has been processed, it is determined that a file has been processed previously but modified since then, its position may be un-marked in the hash table, and the next file (e.g., towards the beginning) in the list may be used to resume the search for a file at which to restart the backup/restore operation. Alternatively, or in addition, in some embodiments it may be desirable to check all of the files in the file list against the hash table to ensure that all changes to files that have been processed are marked, so that the backup will contain the most recent versions of all of the files being backed up. It will be noted that for restore operations, checking processed (e.g., restored) files for changes since an interruption may be unnecessary.

Once a file at which to restart the backup/restore operation has been identified, the interrupted operation may be restarted. The operation may resume from the identified file and continue to process the remaining files in the list of files to be processed by the operation. Using the method described above, it may be possible to restart an interrupted backup or restore operation, near the point at which the interruption occurred, any number of times, as needed or desired. The method may thus potentially save significant network resources over systems in which an interrupted backup or restore operation must be restarted from the beginning.

The approach described herein may provide a number of benefits over prior approaches to restarting backup operations. For example, a typical prior approach might include generating a list of files to be processed, sorting the list, and backing up the files in the sorted order. At certain time intervals, the target computer might check in with a server controlling the backup. Thus, to restart, the server would find the last check point and send that file name to the target computer. The target computer would then also generate a file list and sequentially compare the filename received from the server to each entry in the file list until it found a file that came after (in the sorted order) the check pointed file name. However, with file lists potentially ranging into millions of files, sorting can create significant overhead both in terms of processing time and memory usage. The approach described herein, in contrast, may not use file names (e.g., may instead use unique file identifiers), potentially eliminating the need to perform resource-intensive sorting operations. In addition, because the method described herein may be performed substantially by the target computer (i.e., the computer which is being backed up or restored), the method described herein may help to more evenly distribute workload in a network, as compared to methods in which most or all of the work may be performed by a centralized server.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   a client computer system starting a backup operation to backup a plurality of files from the client computer system to a server computer system;
   for each respective file processed by the client computer system during the backup operation, the client computer system storing information indicating that the respective file was processed by the client computer system during the backup operation; and
   in response to a halt of the backup operation before all of the files of the plurality of files were backed up to the server computer system, the client computer system re-starting the backup operation, wherein the client computer system determines a particular file from which to re-start the backup operation based on the stored information indicating which files were processed by the client computer system before the halt of the backup operation.

2. The method of claim 1,
   wherein, for each respective file processed by the client computer system during the backup operation, said storing the information indicating that the respective file was processed by the client computer system during the backup operation comprises storing a file identifier of the respective file into a data structure on the client computer system.

3. The method of claim 2,
   wherein the data structure stores a Last In First Out (LIFO) stack of file identifiers.

4. The method of claim 1,
   wherein the client computer system stores information including which files were processed by the client computer system during the backup operation by storing a stack of file identifiers as the files are processed by the client computer system;
   wherein the method further comprises the client computer system storing information indicating a minimum and maximum file identifier encountered during the backup operation.

5. The method of claim 4, further comprising:
   the client computer system storing information indicating a timestamp of the start of the backup operation.

6. The method of claim 1,
   wherein the plurality of files are stored on the client computer system in a plurality of volumes, wherein the method further comprises:
   for each respective volume of the plurality of volumes, the client computer system creating a corresponding directory for the respective volume;
   wherein for each respective file of a respective volume processed by the client computer system during the backup operation, the client computer system stores the information indicating that the respective file was processed in the corresponding directory created for the respective volume.

7. The method of claim 1,
   wherein, for each respective file processed by the client computer system during the backup operation, said storing the information indicating that the respective file was processed by the client computer system comprises storing a file identifier of the file into a data structure on the client computer system;
   wherein the client computer system determines the particular file from which to re-start the backup operation by:
   regenerating a list of files to be processed by the backup operation; and
   identifying, from the list of files, the particular file from which to re-start the backup operation based on the file identifiers stored in the data structure.

8. The method of claim 7, further comprising:
   constructing a hash table indexed by the file identifiers;
   wherein identifying the particular file from which to re-start the backup operation comprises utilizing the hash table to search the list of files for the particular file from which to re-start the backup operation.

9. A non-transitory computer readable storage medium storing program instructions executable by one or more processors of a client computer system to cause operations including:
   the client computer system starting a backup operation to backup a plurality of files from the client computer system to a server computer system;
   for each respective file processed by the client computer system during the backup operation, the client computer system storing information indicating that the respective file was processed by the client computer system during the backup operation; and
   in response to a halt of the backup operation before all of the files of the plurality of files were backed up to the server computer system, the client computer system restaring the backup operation, wherein the client computer system determines a particular file from which to re-start the backup operation based on the stored information indicating which files were processed by the client computer system before the halt of the backup operation.

10. The computer readable storage medium of claim 9, wherein, for each respective file processed by the client computer system during the backup operation, the program instructions are executable by the one or more processor to cause the client computer system to store the information indicating that the respective file was processed by the client computer system by storing a file identifier of the respective file into a data structure on the client computer system.

11. The computer readable storage medium of claim 10, wherein the data structure stores a Last In First Out (LIFO) stack of file identifiers.

12. The computer readable storage medium of claim 9, wherein the program instructions are executable by the one or more processors to cause the client computer system to store information indicating which files were processed by the client computer system during the backup operation by storing a stack of file identifiers as the files are processed by the client computer system;
wherein the program instructions are further executable by the one or more processors to cause the client computer system to store information indicating a minimum and maximum file identifier encountered during the backup operation.

13. The computer readable storage medium of claim 12, wherein the program instructions information are further executable by the one or more processor to cause the client computer system to:
store information indicating a timestamp of the start of the backup operation.

14. The computer readable storage medium of claim 9, wherein the plurality of files are stored on the client computer system in a plurality of volumes, wherein the program instructions are further executable by the one or more processors to cause the client computer system to:
for each respective volume of the plurality of volumes, create a corresponding directory for the respective volume; and
for each respective file of a respective volume processed by the client computer system during the backup operation, store the information indicating that the respective file was processed in the corresponding directory created for the respective volume.

15. The computer readable storage medium of claim 9, wherein, for each respective file processed by the client computer system during the backup operation, the program instructions are executable by the one or more processors to cause the client computer system to storing a file identifier of the file into a data structure on the client computer system;
wherein the program instructions are executable by the one or more processors to cause the client computer system to determine the particular file from which to re-start the backup operation by:
regenerating a list of files to be processed by the backup operation; and
identifying, from the list of files, the particular file from which to re-start the backup operation based on the file identifiers stored in the data structure.

16. The computer readable storage medium of claim 15, wherein the program instructions are further executable by the one or more processors to cause the client computer system to:
construct a hash table indexed by the file identifiers; and
identify the particular file from which to re-start the backup operation by utilizing the hash table to search the list of files for the particular file from which to re-start the backup operation.

17. A client computer system comprising:
one or more processors; and
memory storing program instructions executable by the one or more processors to cause operations including:
the client computer system starting a backup operation to backup a plurality of files from the client computer system to a server computer system;
for each respective file processed by the client computer system during the backup operation, the client computer system storing information indicating that the respective file was processed by the client computer system during the backup operation; and
in response to a halt of the backup operation before all the files of the plurality of files were backed up to the server computer system, the client computer system re-starting the backup operation, wherein the client computer system determines a particular file from which to re-start the backup operation based on the stored information indicating which files were processed by the client computer system before the halt of the backup operation.

18. The computer system of claim 17, wherein the program instructions are executable by the one or more processors to cause the client computer system to store information indicating which files were processed by the client computer system during the backup operation by storing a stack of file identifiers as the files are processed by the client computer system;
wherein the program instructions are further executable by the one or more processors to cause the client computer system to store information indicating a minimum and maximum file identifier encountered during the backup operation.

19. The computer system of claim 17, wherein, for each respective file processed by the client computer system during the backup operation, the program instructions are executable by the one or more processors to cause the client computer system to storing a file identifier of the file into a data structure on the client computer system;
wherein the program instructions are executable by the one or more processors to cause the client computer system to determine the particular file from which to re-start the backup operation by:
regenerating a list of files to be processed by the backup operation;
identifying, from the list of files, the particular file from which to re-start the backup operation based on the file identifiers stored in the data structure.

20. The computer system of claim 19, wherein the program instructions are further executable by the one or more processors to cause the client computer system to:
construct a hash table indexed by the file identifiers; and
identify the particular file from which to re-start the backup operation by utilizing the hash table to search the list of files for the particular file from which to re-start the backup operation.

* * * * *